April 11, 1939.  C. E. COOK  2,154,397
WAVE MOTOR
Filed July 19, 1937   2 Sheets-Sheet 1

INVENTOR.
Charles E. Cook
BY
Lancaster, Allwine and Rommel
ATTORNEYS.

April 11, 1939.     C. E. COOK     2,154,397
WAVE MOTOR
Filed July 19, 1937     2 Sheets-Sheet 2

INVENTOR.
Charles E. Cook
BY Lancaster, Allwine and Rommel
ATTORNEYS.

Patented Apr. 11, 1939

2,154,397

UNITED STATES PATENT OFFICE 2,154,397

WAVE MOTOR

Charles E. Cook, Atlanta, Ga., assignor of two-fifths to Herman Walter Cook, Sr., Coral Gables, Fla., and two-fifths to Sarah Bernice Cook Wall, Atlanta, Ga.

Application July 19, 1937, Serial No. 154,505

7 Claims. (Cl. 253—14)

This invention relates to fluid current motors and more particularly to rotary water motors, adapted to be positioned off shore, impelled by waves, and having the axis of rotation of the rotor of the motor substantially parallel with the shore line.

An important object of the invention is to provide a rotary water motor, adapted to operate a mechanism, such as a generator, through the instrumentality of a shaft, for instance, said motor having automatically operated means associated therewith so that no matter which of either of the directions of rotation the rotor may take, the shaft will rotate in a single direction.

Another important object is to provide a water wave motor, including a screw rotor or impeller so disposed and shaped that much of the force of the waves will be utilized in impelling the rotor.

Yet another object is to provide a rotary water motor, with the rotor thereof so disposed and shaped that entrapped air and the buoyancy of the water will be best utilized to float the motor.

Other objects and advantages of the invention will be apparent during the course of the following detailed description, taken in connection with the accompanying drawings, forming a part of this specification and in which drawings.

Figure 1:
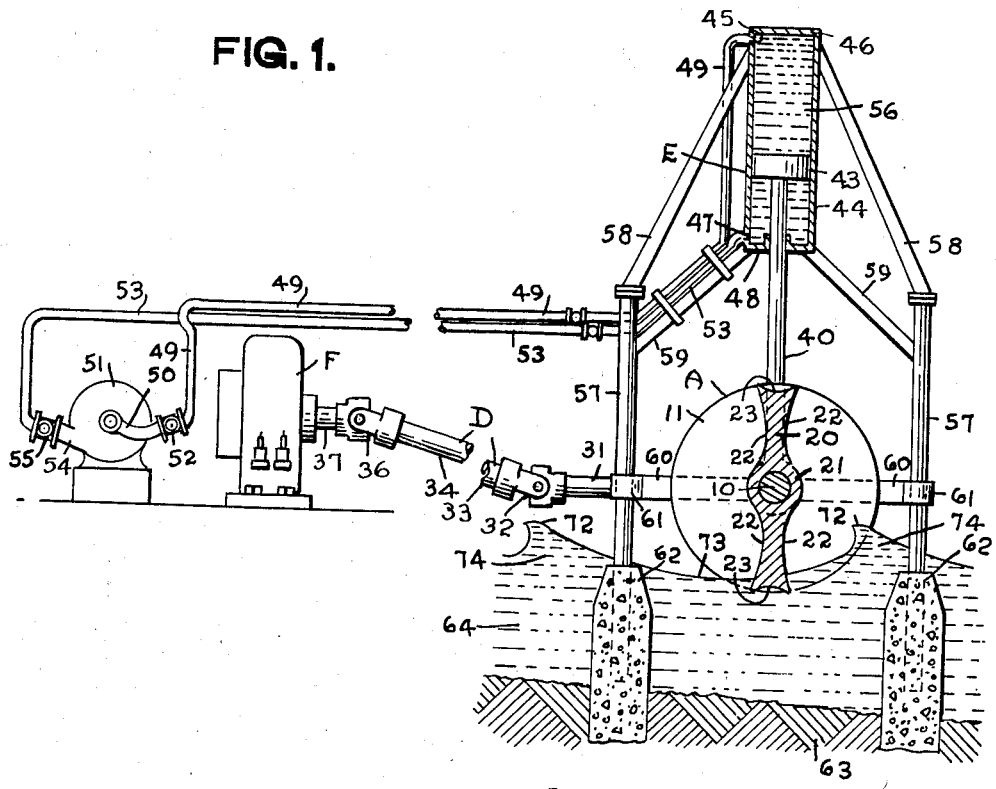
Figure 1 is a transverse section through the novel water motor and illustrating a suitable connection therewith of a mechanism operated thereby.

In the drawings, wherein for the purpose of illustration is shown a preferred embodiment of the invention and wherein similar reference characters designate corresponding parts throughout the several views, the letter A may designate generally the novel water wave motor which may be made up of a single unit B or a combination of units B and C, the letter D motion transmitting means associated therewith, the letter E elevating and lowering means for the motor A and the letter F a mechanism operated by the motor A through the motion transmitting means D.

Figure 2:
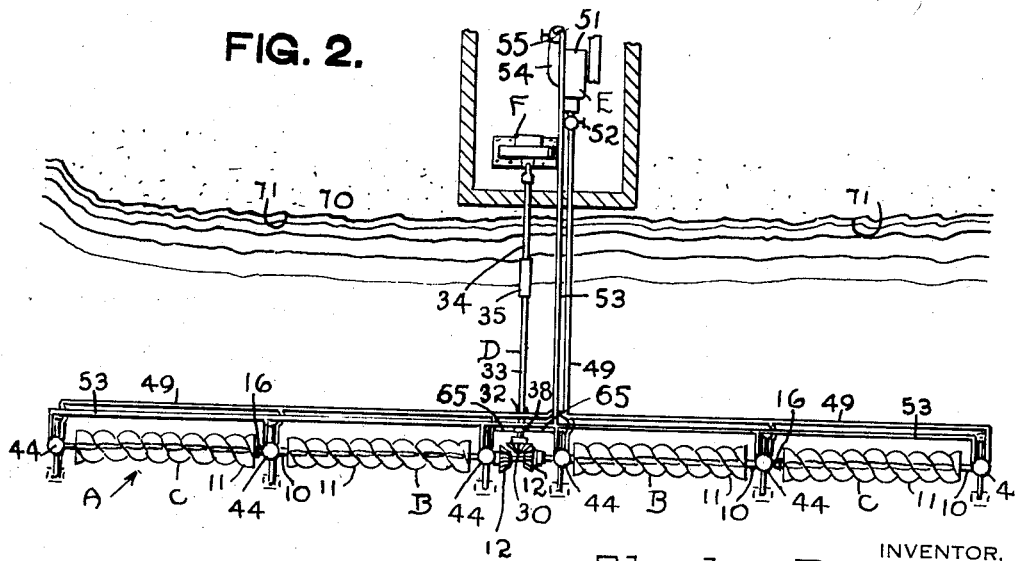
Figure 2 is a top plan view of the new water motor, disposed broadside to a shore line and showing a typical assembly of motor and mechanism operated thereby.
Figure 3:
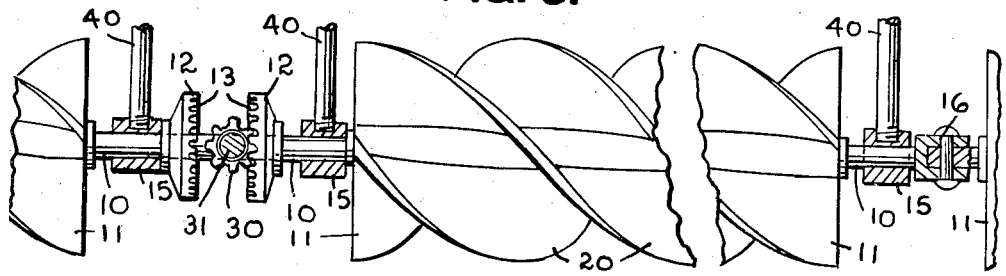
Figure 3 is a side elevation of a portion of a rotor or impeller, and associated structure, forming a part of the novel motor.
Figure 4:
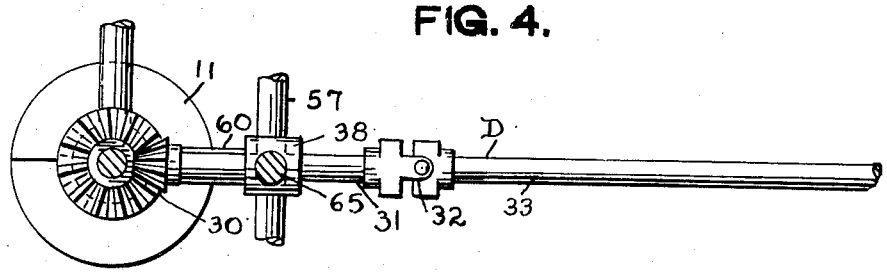
Figure 4 is a transverse section of the associated structure of Figure 3.
Figure 5:
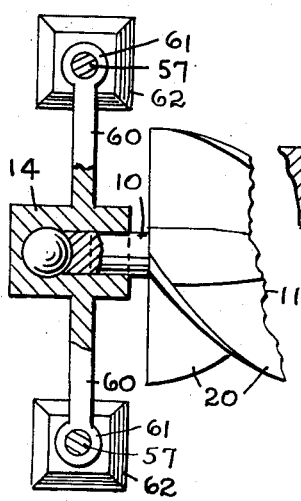
Figure 5 is a fragment of the rotor, showing its association with a thrust bearing forming a portion of the motor structure.
Figure 6:
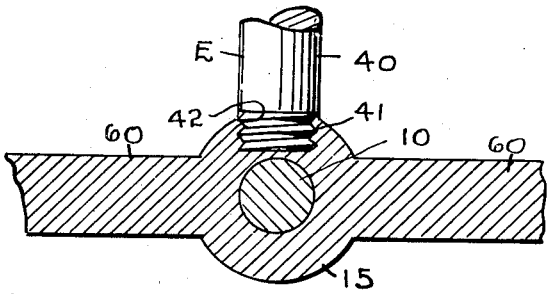
Figure 6 is a vertical section through a bearing forming a part of the motor structure.

The novel water wave motor A may be made up of one or more units, as desired. The main unit B includes a shaft 10, with a pair of screw impellers or rotors 11 pitched in a given direction and fixedly mounted thereon, in any approved way, to rotate therewith. These rotors 11 are spaced apart on the shaft 10, substantially as shown in Figures 2 and 3, and each rotor 11 is provided with a suitable gear, such as a bevel gear 12, fixedly mounted upon the intermediate portion of the shaft 10, preferably spaced from the rotors 11 and spaced apart from each other, with their toothed faces 13 in facing relation, as shown in Figure 3. Bearings may be provided for the shaft 10, such as one between each rotor 11 and its gear 12 and one at adjacent each end of the shaft 10. If but this one unit B is employed in making up the motor A, then the bearings will be thrust bearings 14 as shown in Figure 5, but if there are units C to be connected to the unit B, then the ends of the shaft 10 will extend through the sleeve bearings 15 and terminate in suitable means for connecting another shaft 10 thereto, such as the conventional coupling 16, shown in Figure 3.

The blades 20 of the screw impellers or rotors 11 have substantially the vertical cross section shown in Figure 1. It will be noted that from the hub portion 21 they extend towards the periphery with the opposite faces concave as at 22 and the periphery also concave, as at 23. This shape has at least three functions, as will be later described in detail.

The unit C is substantially like the units B except that it includes preferably but one screw impeller 11 and has no gears. One end of the shaft 10 of the unit C is adapted to cooperate with the coupling 16 so that a unit B and a unit C may be coupled together. The opposite end of the shaft 10 is provided with a thrust bearing 14. The impeller 11 of the unit C is substantially like that of the unit B in all respects. It should be apparent that, without invention, the shaft 10 may be long enough to accommodate more than two impellers 11.

The motion transmitting means D may comprise a pinion 30, the teeth of which are adapted to cooperate with the teeth of the bevel gears 12. This pinion 30 is preferably mounted upon one end of a rotatable member, such as a first shaft section 31, terminating in a universal joint 32 for connection to a second shaft section 33, which may connect with a third shaft section 34 by a conventional slip connection 35, while the third shaft section 34 may be connected, as by a universal joint 36 to a fourth shaft section 37, which is operatively connected in any approved way with the mechanism F. Due to the thrust bearings 14, the shaft 10 carrying the impeller 11, is free to shift longitudinally so that one or the other of the gears 12 will mesh with the pinion 30. This is possible because of the facing relationship of the gears 12 on the same shaft and because the pinion is interposed in the paths of travel of the gears 12. These paths of travel may vary but it is apparent that the distance apart of the toothed faces of the gears 12 must be somewhat greater than the greatest diameter of the pinion 30, as is apparent in Figure 3, and particularly must be a distance sufficient to clear one gear 12 wholly of the pinion 30 before the other gear 12 meshes therewith. The shaft section 31 may rotate in a bearing 38.

The elevating and lowering means E for the motor A may take any approved form. This means is necessary when there is a considerable rise or fall of the water level, as when the motor A is employed where there is a considerable rise and fall in the water level due to tide or when there is a considerable variation in the heights of waves as when there are storms. In the example shown, the motor A is shown suspended by means of suitable vertically disposed rods 40, one for each bearing 14 and 15. These rods may be screw threaded at their lower ends, as at 41, so they may be inserted into screw threaded sockets 42 in the bearings 14 and 15. The rods 40 may terminate in pistons 43 at their upper ends, enclosed by cylinders 44, having one opening 45 adjacent their heads 46 and another opening 47 adjacent their opposite ends 48. A suitable conduit 49 may lead from each opening 45 to one side 50 of a rotary pump 51, with a suitable valve 52 interposed, while a second conduit 53 may lead from each opening 47 to the other side 54 of the rotary pump 51, with a second suitable valve 55 interposed. Any suitable fluid, such as water 56, may be employed and pumped into or drained from the cylinders 44. For instance, with the cylinders filled with water 56, as in Figure 1, the pump 51 may be set into operation, after the valve 52 has been opened simultaneously with the opening of the valve 55 or slightly in advance, and this will cause the pistons 43 in each of the cylinders 44 to rise, elevating the motor A while maintaining it in a substantially horizontal position. By reversing the direction of rotation of the pump 51, the pistons 43 will fall, thus lowering the motor A. A suitable support for the cylinders 44 may be provided such as the uprights 57, supports 58 and braces 59, shown particularly in Figure 1. The conduits 49 and 53 may be supported, in part, by this same structure, as is apparent in Figure 1. Extending horizontally from each bearing 14 and 15 are two arms 60, terminating in eyes 61, which may extend about the uprights 57 so that there is a sliding connection between the arms 60 and the uprights 57, as the motor A is raised or lowered. The uprights 57 may be embedded in foundations 62 which may be sunk into the bed 63 off shore below the water 64. The arms 60, as well as the rods 40, in cooperation with the associated structure, tend to steady the motor A and prevent rocking or transverse shifting thereof.

The bearing 38 of the motion transmitting means D may be provided with arms 65, like the arms 60 and these may be rigidly connected to adjacent arms 60 of two adjacent bearings 15 so that the shaft section 31 carrying the pinion 30 will maintain its horizontal position and will rise or be lowered simultaneously as the motor A is raised or lowered, whereby the pinion 30 will maintain its cooperative relationship with the gears 12.

The mechanism F may be any suitable one operated by rotation of the rotary member, such as the shaft sections 31, 33, 34 and 37 and their associated structure 32, 35 and 36. In the example shown, a conventional generator of electricity is shown, operatively connected with the motion transmitting means D.

In operation, the motor A is placed a suitable distance off shore 70, with the axes of rotation of the screw rotors 11 substantially paralleling the shore line 71. This positions the motor A broadside to or longitudinally paralleling the shore line. A desirable position of the motor A with respect to the crest 72 and trough 73 of the waves 74 of the water 63 is shown in Figure 1, altho there may be reasonable variations in the extent the motor A may be submerged. The waves 74, moving towards the shore line 71, striking the bottom portions of the screw impellers 11 from the off-shore side, will first cause the shaft 10 to shift longitudinally in one direction (as to the left in Figures 2, 3 and 5) and cause one gear 12 to mesh with the pinion 30, while these waves will also cause the screw impellers 11 to rotate in one direction. When, for instance, the wind or breeze shifts to an off shore or land wind or breeze, the waves 74 will move away from the shore and when they strike the bottom portions of the screw impellers 11 from the shore, will cause the shaft 10 to shift longitudinally in the direction opposite to the shift last mentioned. That is, the new shift will be to the right in Figures 2, 3 and 5, and cause the gear 12, then in mesh with the pinion 30, to move with the shaft 10 to the right and, as it clears the pinion 30, the other gear 12 will mesh with the pinion 30 and, at the same time, the shaft 10 and screw impellers 11 will commence to rotate in the direction opposite to their former direction of rotation. However, this will not cause a reversal of the rotation of the pinion 30, as is now apparent, but the latter will continue to rotate in one direction only. Even when there are relatively sudden and short shifts in the direction of the wind and, consequently, differences in the direction of travel of the waves, the motor A will respond and the pinion 30 will rotate in only one direction. Thus, the longitudinal shifting of the shaft 10 is automatic and controlled by the waves themselves, which also rotates the screw impellers 11. The only manual operation is to control the lowering or raising of the motors A, through the means D, and this is only necessary as has been stated.

The shape of the screw impeller blades 20 is such that the concavity 23 in the periphery of the blades 20 tends to entrap air as the impellers 11 rotate, and contribute to the buoyance of the motor A, while the dual concavities 22 in the blades 20 utilize the striking and impelling power of the waves to both rotate the impellers and also cause the longitudinal shifting of the shaft 10, which have been described in detail. It has been found that these concavities 22 concentrate the impelling power of the waves at the center of flight of the impellers and utilize the whole power of the waves, including that of their crest 12, for both shifting and propelling.

Various changes may be made to the form of invention herein shown and described, without departing from the spirit of the invention or the scope of the claims.

What is claimed is:

1. In a water wave motor adapted to be positioned in water off shore, broadside of said shore, a shaft, a pair of spaced apart screw impellers pitched in a given direction and fixedly carried by said shaft, a separate bevel gear for each impeller, fixedly carried by said shaft, being spaced apart and facing each other, a thrust bearing at each end of said shaft, said thrust bearings being spaced from said shaft ends whereby said shaft may shift longitudinally, and motion transmitting means, including a pinion adapted to mesh with either of said bevel gears upon longitudinal shifting of said shaft.

2. In a water wave motor adapted to be positioned in water off shore, broadside of said shore, a shaft adapted to substantially parallel said shore, means cooperating with water waves to cause rotation and automatic longitudinal shifting of said shaft, including a pair of spaced apart screw impellers pitched in a given direction and fixedly carried by said shaft, a separate bevel gear for each impeller, fixedly carried by said shaft, being spaced apart and facing each other, a thrust bearing at each end of said shaft, said thrust bearings being spaced from said shaft ends whereby said shaft may shift longitudinally, and motion transmitting means, including a pinion adapted to mesh with either of said bevel gears upon longitudinal shifting of said shaft.

3. In a water wave motor adapted to be positioned in water off shore, broadside of said shore, a shaft adapted to substantially parallel said shore; a pair of spaced apart bevel gears fixedly carried by said shaft and facing each other; bearings for said shaft; motion transmitting means, including a pinion adapted to mesh with either of said bevel gears, and a shaft mounting said pinion, said last named shaft being disposed substantially normal to said first named shaft; and means cooperating with water waves to rotate said shafts and automatically shift one of said shafts to cause said pinion to mesh alternately with one of said bevel gears and then with the other of said bevel gears, including a pair of screw impellers pitched in a given direction and fixedly carried upon one of said shafts.

4. In a water wave motor adapted to be positioned in water off shore, broadside of said shore; motion transmitting means, including a pinion and a pair of spaced apart driving gears adapted to mesh therewith; and means cooperating with water waves for automatically moving of said driving gears into mesh with said pinion after moving the other of said driving gears out of mesh with said pinion to cause rotation of said pinion, including a screw impeller pitched in a given direction and a longitudinally shifting shaft upon which said impeller and driving gears are fixedly carried.

5. In a water wave motor adapted to be positioned in water off shore, broadside of said shore; motion transmitting means, including a pinion with its axis of rotation substantially normal to said shore and a pair of spaced apart driving gears adapted to mesh therewith with their axes of rotation substantially paralleling said shore; and means cooperating with water waves to cause rotation of said pinion and for automatically moving one of said driving gears into mesh with said pinion after moving the other of said driving gears out of mesh with said pinion, including a screw impeller pitched in a given direction and a longitudinally shifting shaft upon which said impeller and driving gears are fixedly carried.

6. In a water wave motor adapted to be positioned in water off shore, broadside of said shore; a screw impeller pitched in a given direction and with the peripheries of the blades thereof continuously concave.

7. In a motor of the character described, in combination, a screw impeller pitched in a given direction and having a longitudinal axis, means mounting the impeller relative to a body of water having alternate directions of movement, for rotation of the impeller about its axis in either direction and for shifting of the impeller longitudinally of its axis in either direction, depending on the direction of motion of the water, a power take-off shaft, and reversing mechanism operatively connected between said impeller and shaft and operable by said shifting of the impeller longitudinally of its axis to translate alternate rotatory motion of the impeller into unidirectional rotatory motion of the shaft.

CHARLES E. COOK.

CERTIFICATE OF CORRECTION.

Patent No. 2,154,397.  April 11, 1939.

CHARLES E. COOK.

It is hereby certified that error appears in the printed specification of the above numbered patent requiring correction as follows: Page 3, second column, line 8, claim 4, after the word "moving" insert one; and that the said Letters Patent should be read with this correction therein that the same may conform to the record of the case in the Patent Office.

Signed and sealed this 30th day of May, A. D. 1939.

(Seal)

Henry Van Arsdale

Acting Commissioner of Patents.